Patented Feb. 13, 1940

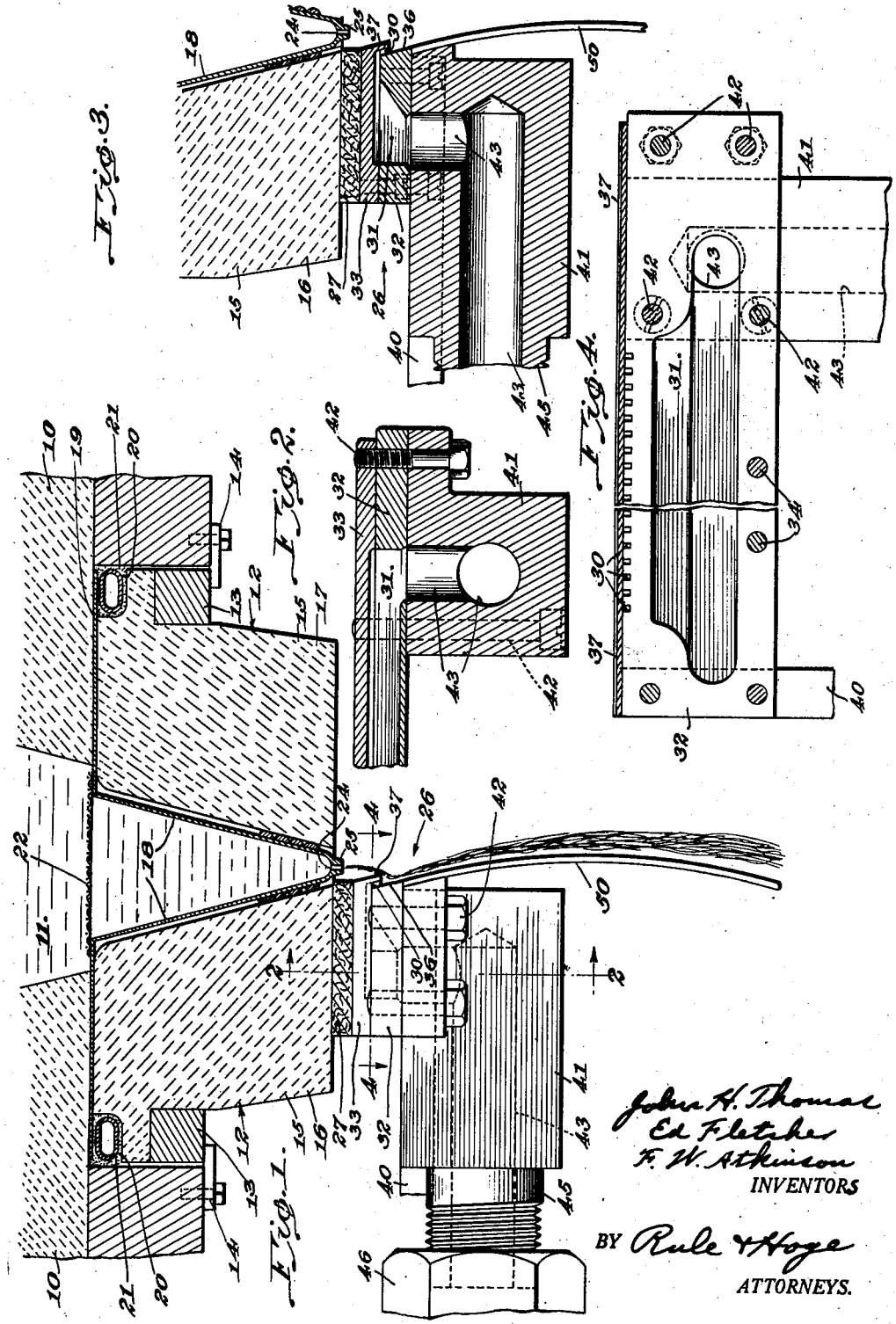

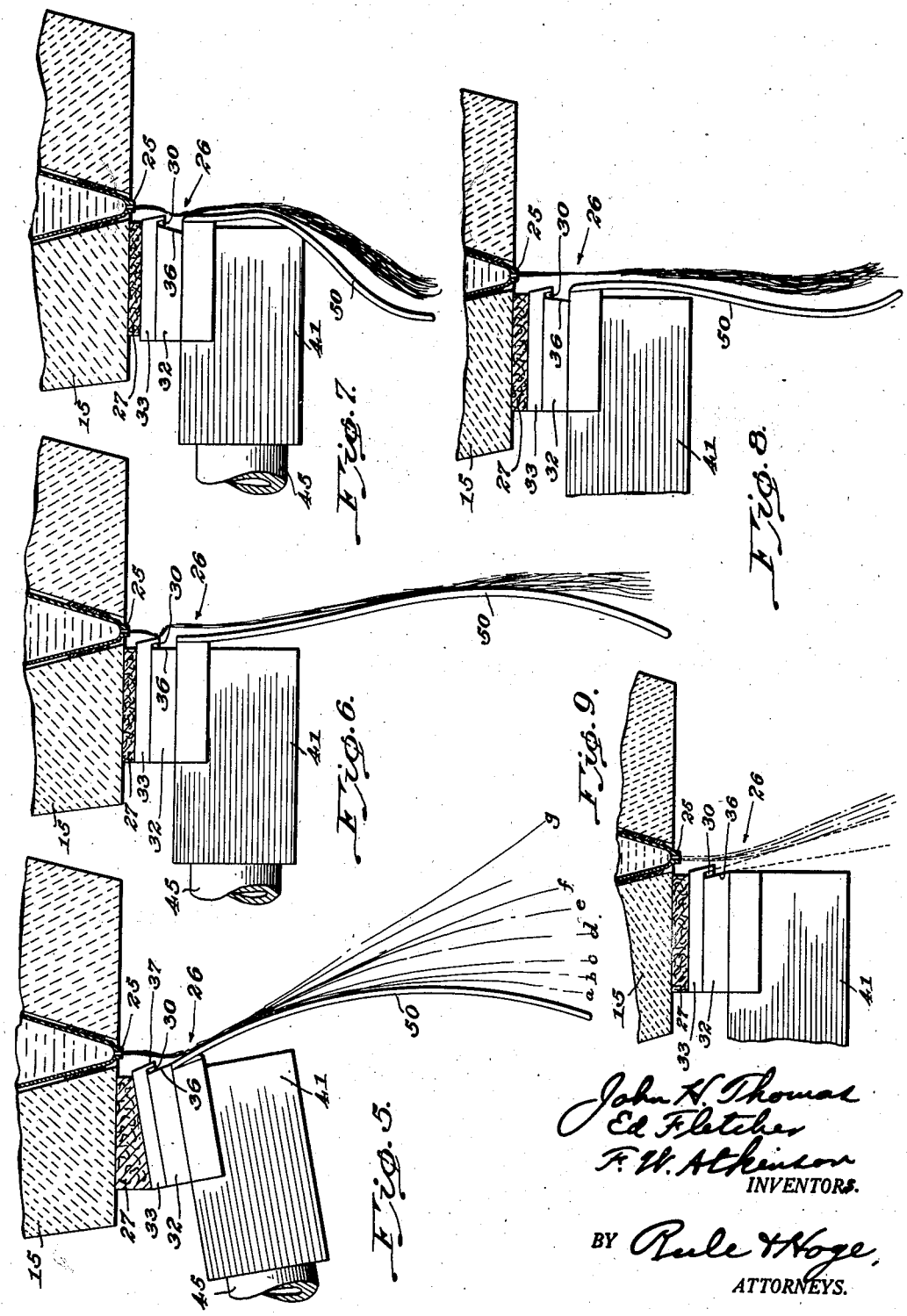

2,189,822

UNITED STATES PATENT OFFICE 2,189,822

METHOD AND APPARATUS FOR MAKING GLASS WOOL

John H. Thomas, Ed Fletcher, and Flavius W. Atkinson, Newark, Ohio, assignor, by mesne assignments, to Owens-Corning Fiberglas Corporation, a corporation of Delaware Application January 17, 1936, Serial No. 59,566

24 Claims. (Cl. 49—17)

The present invention relates to a method and apparatus for drawing fibers such as glass wool from a viscous substance and to a one-sided blower forming a part of said apparatus.

It is an object of the present invention to produce fine attenuated glass wool fibers having an inherent curl or waviness which increases their matting properties.

It is another object of the present invention to provide an apparatus for making glass wool which consumes considerably less gas for drawing and attenuating the fibers than the conventional apparatus.

It is another object of the present invention to provide an apparatus for suspending a stream of molten glass in an air current moving in a direction substantially parallel to the stream of glass and from this point of suspension draw and attenuate a fine fiber or thread.

A further object of the present invention is to provide a novel apparatus for attenuating a stream of glass into fine glass fibers, the apparatus comprising a blower having a directing shield capable of controlling the path of the stream of molten glass and causing it to flow in proximity to and along the contours of the shield.

Other objects and advantages of the present invention will become apparent from the following description taken in conjunction with the drawings, in which:

Fig. 1 is an elevational section view illustrating an embodiment of the present invention;

Fig. 2 is a fragmentary section view of the steam chest of the blower taken along the line II—II of Fig. 1;

Fig. 3 is a fragmentary section view of the blower shown in Fig. 1;

Fig. 1 is a section view of the blower taken along the line IV—IV of Fig. 1;

Figs. 5 to 8 are diagrammatic section views illustrating various modifications of specific embodiments of the present invention individually described hereinafter;

Fig. 9 is a section view depicting a one-sided blower without a shield.

Referring more particularly to Fig. 1, reference character 10 represents the floor of a glass furnace or a forehearth associated therewith, having the boot 11 continually filled with molten glass. In register with the boot 11 is a bushing 12 which is mounted and held in place by the retaining ring 13. Lugs 14 or the like demountably secure the bushing 12 in place. The bushing 12 comprises a refractory block 15 preferably built in identical half sections 16 and 17 respectively, which form a trough therebetween with upwardly divergent side walls. Lining the diverging trough is a platinum thimble 18, which has a broad marginal flange 19 overlying the upper surface of the block 15 and forming a contact between the block and the lower surface of the forehearth floor 10. Around the upper margin of the refractory block 15 is a marginal recess 20 adapted to receive the peripheral cooling pipe 21 which is preferably embedded in a sillimanite cement or the like and lies in proximity to the outer edge of the marginal flange 19. The cooling pipe 21 serves to carry away the excess heat and also serves as a freezing seal to prevent any molten glass from leaking from the boot 11 through the juxtaposed surfaces of the bushing 12 and the forehearth floor 10. Covering the open side of the thimble 18 is a screen 22, preferably made of platinum and welded to the inner edge of the marginal flange 19. The screen 22 serves to filter out any foreign solid matter such as stones or the like. The converging sides of the thimble 18 terminate in a plurality of openings 24, each opening being provided with a tip or nipple 25. The individual nipples prevent the adjacent streams of molten glass which issue from the openings 24 from flowing together and coalescing into a sheet.

Spaced at a point below the nipples 25 and substantially in line with the issuing streams of glass is a blower assembly 26. In order to prevent induced gases from flowing between the blower 26 and the bottom surface of the half section block 16, a seal 27 of asbestos or the like is interposed therebetween.

The blower assembly 26 comprises a plurality of downwardly directed nozzles 30 which lead from a pressure chamber 31 extending lengthwise of the blower. The chamber 31 is formed by a bottom plate 32 and a top plate 33, said plates being secured together by screws 34. The edge 36 of the lower plate 32, which forms the side wall of the blower, is slightly inclined downwardly and outwardly toward the stream of molten glass. The upper portion of the wall 36 is projected or offset outwardly beyond the plane of the lower portion to form a strip having kerfs or slots at short intervals, which in combination with the overlapping flange 37, form the nozzles 30. The kerfs, of course, may be cut in the inner edge of the flange 37 to form the nozzles. At one end of the blower a crossbar 40 is attached to the bottom plate to hold it in spaced relation with the nipples 25. At the other end of the blower is attached a pipe section 41, squared to fit the blower and attached thereto by the bolts 42. The pipe section is formed with ports 43 which open into the pressure chamber 31.

Superheated steam or other gas under pressure is supplied to the blowers through a pipe system comprising a pipe 45 connected to a supply pipe (not shown) by means of the connection 46. Attached to the lower portion of the wall 36 so as to form an extension thereof is a sheet metal shield 50 which may be made in varying lengths and shapes to lead the attenuated fibers downwardly toward a conveyor belt (not shown) or the like and to direct the pulling and induced gases from the blower and surrounding atmosphere along a uniform path. The provision of the shield enables the stream of molten glass or the like to be drawn into and remain in the force of the blast from the blowers.

In the operation of a conventional glass wool blower, which comprises two oppositely spaced blowers, one on each side of the downwardly flowing stream of molten glass, it has been observed that it is necessary to set the blower in such position that the glass streams issuing from the nipples enter the blower at either one or the other side of the center line of the slot formed between the two blowers but never in the center thereof. If the glass streams are located in the center of the blower slot the streams constantly oscillate very rapidly between the steam blowers and each time this position is changed, the fiber is likely to be broken and a slug formed. So it is necessary to locate these streams off center in the slot to obtain a steady pull which will result in a product comparatively free from slugs. It was observed that most of the actual pulling was done by one steam blast, the other blast being merely used to hold the glass in the pulling stream. In an effort to reduce steam consumption and to get better conditions for the working of this part, the present invention contemplates a one-sided blower in combination with a curved shield. The space between the top of the blower and the bottom of the bushing is closed off so that all of the induced air is caused to flow in from one side and hold the stream of molten glass inside of the pulling blast where it may have its most effective pulling action. With this arrangement a condition is provided for flowing a stream of molten glass into a gas blast and from this point at which it enters the blast, the molten glass stream is drawn and attenuated to a fine fiber. In drawing the fiber from this point of entrance of the stream into the gas blast, the stream of glass above said point is substantially free from tension caused by the force of the blast itself. In this manner the stream of glass may flow freely from the supply body orifice whereas in the conventional method the tension from the blast is extended along the stream directly up to the supply body. A curved plate is applied to the bottom of the blowers to direct the fibers in forming an even pack or mat of fibers and to direct the steam blast and induced gases along the contours of the shield. Many variations of the curved surfaces and of the angle from the ejection point of the steam blast to the shield are possible with varying results in the average fiber diameter and length and in the rate of wool production.

By means of the present invention it is possible to make a kinky or curly wool as the glass fibers are drawn out and chilled along the curved surfaces. For example, in producing a coarse fiber used in a filter, it was found advantageous that a certain amount of curl be given to each fiber in order that a proper matting of these fibers could be obtained when they were projected upon the moving conveyor. In order to obtain the needed curl, a curved shield is attached to the lower end of the blower and, owing to the air current set up by the steam blast issuing from the blower, the individual fibers are caused to follow the curve of this shield. In so doing their temperature is reduced to a point where rigidity sets in and the fibers are curled in the direction of the shield.

The present invention has the advantage of curling all the individual fibers by a substantially equal amount. It has been found that in producing a curled fiber a relatively low pressure blast is advantageous so that the induced gases can hold the streams of glass in proximity to and along the contour of the shield. If a high pressure blast is used the stream tends to leave the contour of the shield and follow a line issuing directly from the nozzle of the blower. By making various adjustments in the bushing and forehearth temperature, the blower pressure, the angle and location of the blower and side wall 36 in relation to the stream of molten glass, the size of the nipple openings 25 and by varying the length and shape of the shield 50, it is possible to produce various types of fibers which differ in their average diameter, length and rate of production.

For example, in the specific embodiment shown in Fig. 1, as molten glass issues from nipples 25 having outlet orifices approximately .125 inch in diameter, at a temperature of about 2125° F., various types and sizes of glass fibers may be made by varying the blower pressure. If a blower pressure of sixty pounds per square inch is used, a continuous fiber may be made having an average diameter of about .0025 inch. As the blower pressure is increased the diameter and the average fiber length of the fiber will progressively decrease until at one hundred sixty pounds pressure the average length of fiber may be shorter than one foot. If the force of the blast is increased by an increase in pressure, the path of the attenuated fibers will gradually draw away from the shield at its lower end and tend to follow a straight line issuing directly from the nozzle itself. At lower pressures, however, the induced gases from the atmosphere will attenuate the fibers while following the contour of the shield itself and produce curled fibers, which result has not heretofore been achieved.

By increasing the length and radius of curvature of the shield as, for example, providing a 5½ inch shield having a radius of curvature ranging from six to eight inches, different results may be obtained. As the blower pressure is increased to say from twenty pounds to sixty pounds per square inch, continuous fibers may be produced. From about sixty to one hundred pounds per square inch pressure, the average length remains constant at about thirty inches and as the pressure is increased from there to one hundred sixty pounds per square inch, the fiber length decreases gradually to about fourteen or eighteen inches.

In Fig. 5 there is illustrated as an example, a blower inclined at an angle under the bushing, and, extending from the blower, a relatively short shield about three inches in length and with a radius of curvature of about five and one-half inches. When this arrangement is used the induced air is bent in sharply at the top of the shield and the delivery of the wool from the bottom of the shield tends to be more nearly vertically downward into the receiving hood (not shown). It is also possible to move the point of steam ejection more closely up to the bushing, although away from the glass stream. The lines lettered from *a* to *g* represent the general paths taken by the fibers as they are blown by progressively greater pressures from the blower. The path *a* is followed when a low blower pressure of about twenty pounds per square inch is used. The resulting fiber is about .005 inch to .006 inch in diameter and is continuous in length. As the blower pressure is gradually increased to one hundred sixty pounds per square inch, the average fiber diameter decreases to less than .001 inch and the average fiber length decreases to less than one foot. The changes in size of the fibers through range of pressure changes do not necessarily change in exact proportions thereto, and, as a matter of fact, may actually vary partly directly and partly inversely to the pressure.

Fig. 6 illustrates an embodiment in which the position of the wall 36 is vertical and the upper edge of the shield is set out from the bottom plate 32. This arrangement causes the path taken by the glass streams to curve quite sharply around the step formed by the offset of the shield from the wall 36. The shape of the shield in this specific embodiment is a gradual reverse curve which permits the fibers to hug the contours of the shield during the formation period. With a blower pressure of about one hundred forty-five pounds, an average length of about eight inches and a fiber diameter of .002 inch may be obtained.

In Fig. 7 the wall 36 under the point of ejection is set at a backwardly directed angle of 12° to the vertical which is opposite of the conventional direction and the top corner of the shield 50 is well rounded to streamline the edge. The shield is provided with a relatively sharp reverse curve in a direction opposite that shown in Fig. 6. The result obtained with this arrangement under a blower pressure of about one hundred fifty-five pounds is an average fiber diameter of .0012 inch and an average fiber length of eight inches. If the angle of the wall 36 is pointed in the direction as shown in Fig. 1, a fiber diameter of less than .001 inch and a fiber length of twenty inches may be obtained.

Fig. 8 depicts an arrangement in which the wall 36 is set inwardly from the direction of steam blast as in Fig. 7 and the shield 50 is provided with a gradual reverse curve. Results similar to those set forth hereinabove are obtained with this arrangement. It will be noted that the above specific embodiments are merely set forth as examples and illustrations of the fact that fibers of varying sizes and types may be obtained by varying pertinent factors. No limitation of the claims is intended by the disclosure of the specific embodiments and it is understood that variations and modifications may be made without departing from the spirit of the invention.

In Fig. 9 a construction has been shown in which a one-sided blower 26 of the same construction as disclosed in Fig. 1 is combined with the bushing 15 having the sealing member 27 mounted therebetween, but in which no individual shield has been incorporated. The nozzle 30 is spaced below the nipple 25 and is directed downwardly at an acute angle to and in approximately the same general direction as the stream flow issuing from the nipple 25. There is practically no tendency for the glass streams to pull into the steam blast, but, on the contrary, the glass streams ride on top or along the surface of the steam. Although it would seem that a blast of steam directed against a stream of molten glass in the manner shown, would drive the stream away from the blast and prevent its being pulled or attenuated into fibers, nevertheless, it is found that the stream of glass and the steam blast are carried along together and the glass drawn out to a fine fiber. For example, with a blower pressure of one hundred forty-five pounds per square inch, a molten glass stream, issuing from nipples having an orifice diameter of .125 inch, will be attenuated to fine glass fibers having an average diameter of about .002 inch and an average fiber length of about four inches.

Modifications may be resorted to within the scope of the appended claims.

We claim:

1. The method which comprises, projecting from a supply body of liquid material, an uninterrupted stream of the material in a semi-fluid or plastic condition, directing a blast of gas onto said stream at one side thereof and in a direction approximately the same as that of the stream flow and causing the stream to be held against the blast by an induced air current, thereby drawing out and attenuating said stream into long fine fibers, said blast being directed wholly from one side of said stream.

2. The method which comprises, projecting from a supply body of liquid material, an uninterrupted stream of the material in a semi-fluid or plastic condition, directing a blast of gas onto said stream at one side thereof and in a direction approximately the same as that of said stream flow and causing the stream to be held against the blast by an induced air current, thereby drawing out and attenuating said stream into long fine fibers, said blast being directed wholly from one side of said stream, and preventing the admission of induced gases from the side of the stream on which the blast is directed.

3. The method which comprises, projecting from a supply body of liquid material, an uninterrupted stream of the material in a semi-fluid or plastic condition, directing a blast of gas onto said stream at one side thereof and in a direction approximately the same as that of said stream flow and causing the stream to be held against the blast by an induced air current, thereby drawing out and attenuating said stream into long fine fibers, said blast being directed wholly from one side of said stream, and directing said attenuated stream along a curved surface while the said material is still in a plastic or formative condition.

4. The method which comprises, projecting from a supply body of liquid material, an uninterrupted stream of the material in a semi-fluid or plastic condition, directing a blast of gas onto said stream at one side thereof and in a direction approximately the same as that of said stream flow and causing the stream to be held against the blast by an induced air current, thereby drawing out and attenuating said stream into long fine fibers, said blast being directed wholly from one side of said stream, and cooling said attenuated stream while moving along a curved surface and while in a plastic state to produce a curled fiber.

5. The method which comprises establishing a stream of material in a semi-fluid or plastic condition and drawing said stream continuously into a single attenuated filament of many times smaller diameter than said stream by applying to the surface of the stream, in the general direction of the stream flow and from one side only thereof, an elastic moving body.

6. The method which comprises establishing a stream of molten glass in a semi-fluid or plastic condition and drawing said stream continuously into a single attenuated filament of many times smaller diameter than said stream by applying to the surface of the stream, in the general direction of the stream flow and from one side only thereof, an elastic moving body.

7. The method which comprises, projecting from a supply body of molten glass, an uninterrupted stream of the molten glass in a semi-fluid or plastic condition, directing a blast of gas onto said stream at one side thereof and in a direction approximately the same as that of said stream flow and causing the stream to be held against the blast by an induced air current, thereby drawing out and attenuating said stream into long fine fibers, said blast being directed wholly from one side of said stream, and then cooling said stream while still in a plastic or formative condition along a curved surface to produce a curled fiber.

8. The method which comprises, projecting from a supply body of molten glass, an uninterrupted stream of the molten glass in a semi-fluid or plastic condition, directing a blast of gas onto said stream in a direction substantially identical with that of said stream to impinge upon and attenuate said stream into long fine fibers, said blast being directed wholly from one side of said stream, preventing the admission of induced gases from the side of the stream on which said blast is directed so as to permit the air induced by the blast from the side of the stream lying opposite the blast to maintain said stream within the force of said blast.

9. The method which comprises, projecting from a supply body of molten glass, an uninterrupted stream of the molten glass in a semi-fluid or plastic condition, directing a blast of gas onto said stream in a direction substantially identical with that of said stream to impinge upon and attenuate said stream into long fine fibers, said blast being directed wholly from one side of said stream, preventing the admission of induced gases to said stream from the side from which said blast is directed so as to permit the air induced by the blast from the side opposite the blast to maintain said stream within the force of said blast, and cooling said stream along a curved surface while still in a plastic or formative condition so as to produce an inherent curl in said fibers.

10. The method which comprises, projecting from a supply body of molten glass, an uninterrupted stream of the molten glass in a semi-fluid or plastic condition, directing a blast of gas onto said stream in a direction substantially identical with that of said stream to impinge upon and attenuate said stream into long fine fibers, said blast being directed wholly from one side of said stream, preventing the admission of induced gases to said stream from the side from which said blast is directed so as to permit the air induced by the blast from the side opposite the blast to maintain said stream within the force of said blast, and cooling said stream along a curved surface while still in a plastic or formative condition so as to produce an inherent curl in said fibers and causing said curled fibers to be progressively intertwined so as to form a mat as they are formed.

11. In combination, means for producing a continuous fine stream of molten glass, and a blower arranged along one side only of said stream and adapted to blow in the same general direction as the said stream to attenuate said stream into long fine fibers and to induce gases from the atmosphere lying opposite the said blower to maintain said stream in the force of said blast.

12. In combination, means for producing a continuous fine stream of molten glass, a blower arranged along one side only of said stream, and a shield mounted below said blower on the same side of the stream as said blower, the blower being adapted and arranged to blow in the same general direction as the said stream and thereby attenuate said stream into long fine fibers and to induce gases from the atmosphere lying opposite the said blower to maintain said stream in the force of said blast.

13. In combination, means for producing a continuous fine stream of molten glass, a blower arranged along one side only of said stream and adapted to blow in the same general direction as the said stream, and means for shutting out from the stream the induced gases from the side on which said blower is located to attenuate said stream into long fine fibers and to induce gases from the atmosphere lying opposite the said blower to maintain said stream in the force of said blast.

14. In combination, means for producing a continuous fine stream of molten glass, a blower arranged along one side only of said stream and adapted to blow in the same general direction as the said stream, a shield mounted below said blower on the same side of the stream as said blower for maintaining said stream within the blast of said blower, and means for shutting out the induced gases from the side on which said blower is located to attenuate said stream into long fine fibers and to induce gases from the atmosphere lying opposite the said blower to maintain said stream in the force of said blast.

15. The combination of a blower for drawing a stream of material in a fluid or semi-viscous condition from one side of and along the same general direction as said stream, a shield mounted below said blower, and means for preventing the induction of air to said stream from the side on which said blower is located.

16. The method which comprises, projecting from a supply body of liquid material, a stream of material in a semi-fluid or plastic condition, directing a blast of gas onto said stream at one side thereof and in a direction approximately the same as that of the stream flow, thereby drawing out and attenuating said stream into a long fine fiber, the pressure producing said blast being from about ten to fifty pounds per square inch, and directing said stream during the attenuation period and while still in a formative condition along a curved surface to produce a fiber having an inherent curl therein.

17. The combination of means for flowing a small stream of molten viscous material, a blower positioned and arranged to apply to said stream a blast of gas moving in the same general direction as the stream flow and causing the stream to be attenuated to the form of a filament by the force of the blast, and a shield extending from a point in close proximity to the blower and positioned to provide a guiding surface for the filament while the later is cooling and solidifying, said shield having its said guiding surface curved to direct the filament in a curved path during said solidification, whereby a permanent curl or waviness is imparted to the filament.

18. The method which comprises producing a blast of gas and causing an induced draft of gas to be drawn from one side of said blast to and moved with said blast, flowing into said blast from the same side thereof a stream of molten glass moving in a direction approximately parallel with said blast of gas, and thereby causing the flowing glass to be held in the blast by the induced draft and after entering the blast to be drawn and attenuated to a fine fiber or filament by the force the the blast applied to that portion of the stream which is within the blast.

19. The method which comprises producing a blast of gas and causing an induced draft of gas to be drawn from one side of said blast to and moved with said blast, flowing into said blast from the same side thereof a stream of molten glass moving in a direction approximately parallel with said blast of gas, and thereby causing the flowing glass to be held in the blast by the induced draft and after entering the blast to be drawn and attenuated to a fine fiber or filament by the force of the blast applied to that portion of the stream which is within the blast, said stream above the point at which it flows into the blast being substantially free from any tension due to the force of said blast.

20. The method which comprises producing a blast of gas and causing an induced draft of gas to be drawn from one side of said blast to and moved with said blast, flowing into said blast from the same side thereof a stream of molten glass moving in a direction approximately parallel with said blast of gas, and thereby causing the flowing glass to be held in the blast by the induced draft and drawn and attenuated to a fine fiber by the force of the blast.

21. The method which comprises projecting from a supply body a stream of viscous material, attenuating said stream into a fibrous form by means of a gaseous vehicle flowing in a predetermined curved path, directing said stream in said path and cooling the stream, during its movement along said path and thereby causing it during said movement to set or solidify and produce a permanently curved or wavy filament.

22. The method which comprises continuously flowing a stream of molten viscous material, attenuating said stream into fibrous form by means of a gaseous vehicle flowing in a curved path, directing said stream in said path, and while said stream is moving longitudinally along and in such path cooling said stream to cause it to set or solidify in the form of a curved or wavy filament.

23. The method which comprises projecting a molten viscous stream of material from a supply body, subjecting said stream to the force of a blast by which it is drawn and attenuated to filamentary form and cooled and solidified, and directing said blast and the material in a curved path while subjected to said force, whereby a permanent curvature or curl is given to the filament.

24. The combination with means for flowing a substantially straight row of closely and uniformly spaced streams of molten or viscous glass from a supply body of molten glass, of a blower associated therewith and positioned on one side only of said row and adjacent the path of said streams, said blower having outlet means parallel with said row of streams, the blower being constructed to direct a blast of gas in a downwardly inclined direction toward said streams from one side thereof with the blast distributed in flat sheet formation along said row of streams and with the direction of the blast inclined to the direction of stream flow at an angle of approximately 12 degrees, whereby the gas is caused to impinge upon the streams of glass and attenuate them to the form of fine filaments, and gases from the atmosphere are induced from the side opposite said blower to cause the streams to be directed into and be attenuated by said blast.

JOHN H. THOMAS.
ED FLETCHER.
FLAVIUS W. ATKINSON.